Patented Mar. 26, 1946

2,397,358

UNITED STATES PATENT OFFICE 2,397,358

PROCESS FOR PREPARATION OF CHLORONITROALKANES

Shirley P. Lingo, Terre Haute, Ind., assignor to Commercial Solvents Corporation, Terre Haute, Ind., a corporation of Maryland No Drawing. Application March 5, 1945, Serial No. 581,184

4 Claims. (Cl. 260—644)

My invention relates to a process for producing chloronitroalkanes. More particularly, it relates to the preparation of such compounds by the chlorination of a nitro alcohol of the formula:

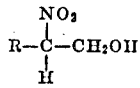

wherein R may represent either hydrogen or alkyl. As examples of suitable nitro alcohols, there may be mentioned 2-nitro-1-ethanol, 2-nitro-1-propanol, 2-nitro-1-butanol, 2-nitro-1-pentanol and the like.

This application is a continuation-in-part of my co-pending application, Serial No. 502,811 filed September 17, 1943.

Nitro alcohols of the above type have previously been converted into the corresponding 1-chloro-2-nitro-alkanes. However, the conversion obtained in the procurement of such compounds have been relatively poor, i. e., of the order of 35-40 per cent.

I have now discovered that 1-chloro-2-nitroalkanes can be readily produced in conversions of 80-85 per cent by subjecting a nitro alcohol of the above-described type to the action of a chlorinating agent, such as, for example, sulfuryl chloride or thionyl chloride, in the presence of a pyridine base. In carrying out the process of my invention, the reactants should be mixed in the definite sequence described below. In order to obtain consistently high conversions of the chloronitroalkanes, I have found it essential to add to the chlorinating agent, dissolved in a suitable solvent, a mixture consisting of solvent, nitro alcohol and pyridine base, the latter being preferably anhydrous, and the order of mixing the reactants being critical to the production of high yields of the order claimed, as brought out above.

In addition to the surprising fact that the order of mixing the reactants in the presence of a pyridine base in the reaction medium results in greatly increased conversions of the nitro alcohols of the corresponding chloronitroalkanes, I have found that nitro alcohols having no hydrogen on the carbon atom adjacent to the carbon holding the primary alcohol group, will not undergo the aforesaid reaction, under the conditions herein described.

The conditions under which the process of my invention may be carried out, can vary considerably, and in general it will be found that such factors as temperature, ratio of reactants, the quantity of pyridine base present, and the solvent utilized, ordinarily depend upon the particular nitro alcohol which it is desired to chlorinate. Although the reaction mentioned above can be effected at temperatures ranging from about room temperature to 100° C., I prefer to utilize temperatures of between 65° and 80° C. The solvent employed may be selected from any one of a number of substances such as, for example, methylene chloride, carbon tetrachloride, toluene, benzene, and the like. In general, I prefer to use carbon tetrachloride. The molar ratio of reactants, as well as the proportion of pyridine base present, may vary within rather wide limits. However, for consistently satisfactory results, I have found it preferable to employ a molar excess of both the chlorinating agent and pyridine base and to mix the reactants in the order mentioned, adding the nitroalcohol-pyridine solvent mixture to the chlorinating agent dissolved in a solvent.

In this connection, the expression "pyridine base," as used in the present description, is to be construed to include quinoline, in addition to the commonly-known pyridine bases, such as the methylpyridines (picolines), the dimethylpyridines (lutidines) and the trimethylpyridines (collidines). These pyridine bases may be conveniently prepared for use in my process by careful fractional distillation thereof, or by drying with anhydrous potassium hydroxide, decanting off the dried liquid and distilling.

My invention may be more specifically illustrated by the following example:

*Example*

A solution consisting of 59.5 parts of 2-nitro-1-butanol and 43 parts of anhydrous pyridine in 135 parts of carbon tetrachloride was added dropwise to a solution of 65.5 parts of thionyl chloride dissolved in 75 parts of carbon tetrachloride. During the addition of nitroalcohol solution to the thionyl chloride solution considerable heat was evolved, and it was found necessary to employ external cooling in order to maintain the temperature of the reaction mixture at 65°–70° C. After the reaction appeared to be complete, the mixture was washed with water and the oil layer steam-distilled. The oily product thus obtained was separated and dried over anhydrous sodium sulfate, after which the dried product was distilled and the substantially pure 1-chloro-2-nitrobutane collected at 50° C. (3 mm.). The quantity of 2-nitro-1-butanol converted to 1-chloro-2-nitrobutane amounted to 58.0 parts corresponding to 85 per cent of theory.

It is to be specifically understood that the above example serves only to illustrate the process of the present invention, and is to be in no way construed as limiting the scope thereof since I have found that the aforesaid process is generally applicable to nitro alcohols of the above-described type. Modifications that would normally occur to one skilled in the art, however, are considered to lie within the scope of the present invention.

My invention now having been described, what I claim is:

1. In a process for the preparation of 1-chloro-2-nitroalkanes, the step which comprises adding a mixture of a pyridine base, an inert solvent and a nitro alcohol having the structural formula:

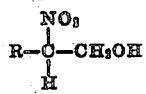

wherein R represents a member selected from the group consisting of hydrogen and alkyl, to a chlorinating agent selected from the group consisting of thionyl chloride and sulfuryl chloride; and an inert solvent.

2. In a process for the preparation of 1-chloro-2-nitroalkanes, the step which comprises adding a mixture of a pyridine base, an inert solvent and a nitro alcohol having the structural formula:

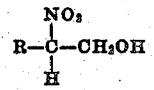

wherein R represents a member selected from the group consisting of hydrogen and alkyl to a mixture of thionyl chloride and carbon tetrachloride.

3. In a process for the preparation of 1-chloro-2-nitroalkanes, the step which comprises adding a mixture of a pyridine base, an inert solvent and a nitro alcohol having the structural formula:

$$R-\underset{H}{\overset{NO_2}{C}}-CH_2OH$$

wherein R represents a member selected from the group consisting of hydrogen and alkyl to a mixture of sulfuryl chloride and carbon tetrachloride.

4. In a process for the preparation of 1-chloro-2-nitrobutane, the step which comprises adding a mixture of 2-nitro-1-butanol, an inert solvent and a pyridine base to a mixture of an inert solvent and a chlorinating agent selected from the group consisting of thionyl chloride and sulfuryl chloride.

SHIRLEY P. LINGO.